March 11, 1941.  E. B. NICHOLS  2,234,942

COMBINED WRITING IMPLEMENT AND MAGNIFYING DEVICE

Filed July 24, 1939

Inventor
*Edgar B. Nichols*

By

Attorney

Patented Mar. 11, 1941

2,234,942

UNITED STATES PATENT OFFICE 2,234,942

COMBINED WRITING IMPLEMENT AND MAGNIFYING DEVICE

Edgar B. Nichols, Moorestown, N. J.

Application July 24, 1939, Serial No. 286,072

1 Claim. (Cl. 88—39)

This invention relates to a combined writing implement and magnifying device, and more particularly to a unitary structure embodying a mechanical pencil and magnifying lens.

In many fields of work, there are numerous instances when one finds it extremely helpful, if not even necessary, to employ a magnifying lens. Various devices have been suggested heretofore wherein a magnifying lens is incorporated, such as letter openers, etc. However, in all such cases with which I am familiar, the instrument is not of such a character as to be conveniently carried within the pocket. Moreover, such instruments are usually of such a nature that they are not readily usable with great ease and comfort.

The primary object of my present invention, therefore, is to provide an improved magnifying device and holder therefor which will be free from the aforementioned objections.

More particularly, it is an object of my present invention to provide an improved unitary magnifying device and holder therefor which can be conveniently carried in the pocket or handbag of the user.

Another object of my invention is to provide an improved device as aforesaid which can be applied very easily and conveniently to the article to be read or examined through the magnifying element.

It is also an object of my present invention to provide an improved device as aforesaid which can be fabricated very quickly and easily, and which is highly efficient in use.

In accordance with my present invention, I employ the barrel or casing of a writing implement, such as a mechanical pencil or a fountain pen, as a holder for the magnifying lens and mount the lens on the cap of the writing implement. Thus, no more room is required to carry my improved combination than is required for the pen or pencil alone. Preferably, the magnifying element is of a type which may be placed flat against the material to be examined therethrough, and its axis is arranged at an angle to that of the holder, so that the holder, or pencil casing, extends upwardly away from the portion being examined. This enables the user to grasp and hold the pencil casing comfortably with one hand while applying the magnifying element to the aforementioned material.

The novel features that I consider characteristic of my invention are set forth with particularity in the appended claims. The invention itself, however, both as to its organization and manner of use, together with additional objects and advantages thereof, will best be understood from the following description of an embodiment thereof, when read in connection with the accompanying drawing, in which—

Figure 1:
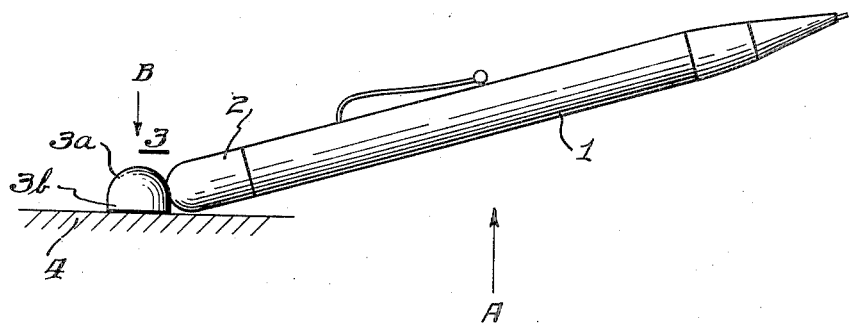
Figure 2:
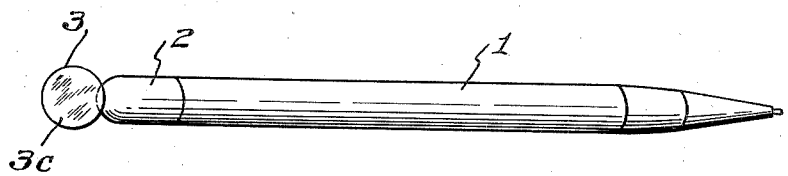

Figure 1 is a side elevation of a combined pencil and magnifying lens embodying my invention, and showing the magnifying lens applied to a member to be examined, and Figure 2 is a bottom plan view thereof looking in the direction of the arrow A.

Referring more particularly to the drawing, wherein similar reference characters designate corresponding parts throughout, there is shown a writing implement, such as a mechanical pencil having a barrel or casing 1 to which is applied a cap or closure member 2 in well known manner. Secured to the cap 2, as by a suitable cement, is an optical magnifying element or lens 3 through which a magnified image of a selected portion of a material 4 may be seen when viewed in the direction of the arrow B.

The lens 3 is preferably constituted by a partly spherical lens portion 3a and a cylindrical portion 3b, the latter terminating in a plane surface 3c adapted to be placed flat against the surface of the material 4 which is to be examined. The axes of the lens portions 3a and 3b are coincident and the height of the lens portion 3b is such that, when the lens is applied to the material 4, as shown, the surface of the material 4 will be in focus with the lens portion 3a to provide maximum magnification.

The lens 3 is so arranged on the cap 2 that its axis forms an angle other than a right angle with the axis of the cap 2 and the barrel 1. Thus, when the plane lens surface 3c is placed flat against the material 4, the lens holder constituted by the barrel 1 and its cap 2 extends upwardly away from the material 4. This arrangement greatly facilitates grasping and holding the pencil casing with one hand, since the fingers may encircle the casing 1 above the material 4 in a convenient manner and without striking the material 4.

From the foregoing description, it will be obvious to those skilled in the art that I have provided a novel and improved combination magnifying lens and holder therefor which has great practical utility without requiring any more space for storage than is required by the holder alone. Although I have shown and described but one embodiment of my invention, I am fully aware that many other modifications thereof are possible. I therefore do not wish to limit myself other than is necessitated by the prior art and by the spirit of the appended claim.

I claim as my invention:

A device of the class described comprising, in combination, a casing for a writing implement constituting a holder, a cap member associated with and forming an extension of said casing and a magnifying lens secured directly to said cap member, said lens comprising a spherical lens portion and a cylindrical portion terminating in a plane surface adapted to lie flat against the material to be examined and having a focal length such that said material will be in focus with said lens when said plane surface lies flat against it, and said cap member being secured to said lens at one side of said lens with the axis of said casing forming an obtuse angle with said plane surface such that when said plane surface lies flat against said material, said casing extends upwardly away from said material sufficient to permit encircling of said casing by the fingers.

EDGAR B. NICHOLS.